(12) United States Patent
Ogawa et al.

(10) Patent No.: US 9,536,431 B2
(45) Date of Patent: Jan. 3, 2017

(54) DRIVING SUPPORT APPARATUS AND DRIVING SUPPORT METHOD

(71) Applicant: DENSO CORPORATION, Kariya, Aichi-pref. (JP)

(72) Inventors: Keiko Ogawa, Kariya (JP); Shunsuke Suzuki, Aichi-ken (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 0 days.

(21) Appl. No.: 14/381,658

(22) PCT Filed: Feb. 27, 2013

(86) PCT No.: PCT/JP2013/055118
§ 371 (c)(1),
(2) Date: Aug. 28, 2014

(87) PCT Pub. No.: WO2013/129470
PCT Pub. Date: Sep. 6, 2013

(65) Prior Publication Data
US 2015/0054638 A1    Feb. 26, 2015

(30) Foreign Application Priority Data

Feb. 29, 2012   (JP) ................................. 2012-044249

(51) Int. Cl.
    *B60Q 1/00*          (2006.01)
    *G08G 1/16*          (2006.01)
    *G06K 9/00*          (2006.01)

(52) U.S. Cl.
CPC ........... *G08G 1/167* (2013.01); *G06K 9/00798* (2013.01)

(58) Field of Classification Search
CPC ........... G01S 13/931; G01S 2013/9342; G08G 1/166; G08G 1/167; G06K 9/00798; G06K 9/00805; G06T 2207/30256; B60T 8/17557; B60T 2201/08; B60W 30/12
(Continued)

(56) References Cited

U.S. PATENT DOCUMENTS

2004/0010371 A1    1/2004   Matsumoto et al.
2005/0267684 A1    12/2005   Kawakami et al.
(Continued)

FOREIGN PATENT DOCUMENTS

JP      H11180328 A     7/1999
JP      3092802 B1       9/2000
(Continued)

OTHER PUBLICATIONS

International Search Report (in Japanese with English Translation) and Written Opinion for PCT/JP2013/055118, mailed May 14, 2013; ISA/JP.
(Continued)

*Primary Examiner* — Thomas Mullen
(74) *Attorney, Agent, or Firm* — Harness, Dickey & Pierce, P.L.C.

(57) ABSTRACT

A driving support apparatus is provided that supports driving of a vehicle that is traveling on a road. In the apparatus, a cruising lane on the road is detected. When the cruising lane cannot be detected, an extrapolation cruising lane formed by extrapolating a previously detected cruising lane is set. A length of time over which the extrapolation cruising lane is set is decided based on the distance between the previously detected cruising lane and the vehicle and/or a lateral speed of the vehicle. Furthermore, whether or not the vehicle will deviate from the detected cruising lane or the set extrapolation cruising lane within a reference time that is set in advance is determined. Driving support is performed based on the determination result.

5 Claims, 9 Drawing Sheets

(58) Field of Classification Search
USPC ........ 340/439, 576, 435; 701/1, 41; 348/148
See application file for complete search history.

(56) References Cited

U.S. PATENT DOCUMENTS

| | | | |
|---|---|---|---|
| 2009/0030613 A1 | | 1/2009 | Kataoka et al. |
| 2011/0115912 A1* | | 5/2011 | Kuehnle ............ G06K 9/00798 |
| | | | 348/148 |

FOREIGN PATENT DOCUMENTS

| | | |
|---|---|---|
| JP | 3214938 B2 | 10/2001 |
| JP | 2003223700 A | 8/2003 |
| JP | 3736413 B2 | 1/2006 |
| JP | 2006331219 A | 12/2006 |
| JP | 4082388 B2 | 4/2008 |
| JP | 2010009361 A | 1/2010 |
| JP | 2010146470 A | 7/2010 |
| JP | 2010247656 A | 11/2010 |

OTHER PUBLICATIONS

Office Action dated Jan. 19, 2016 in corresponding Japanese Application No. 2012-044249 with English translation.

* cited by examiner

FIG.7
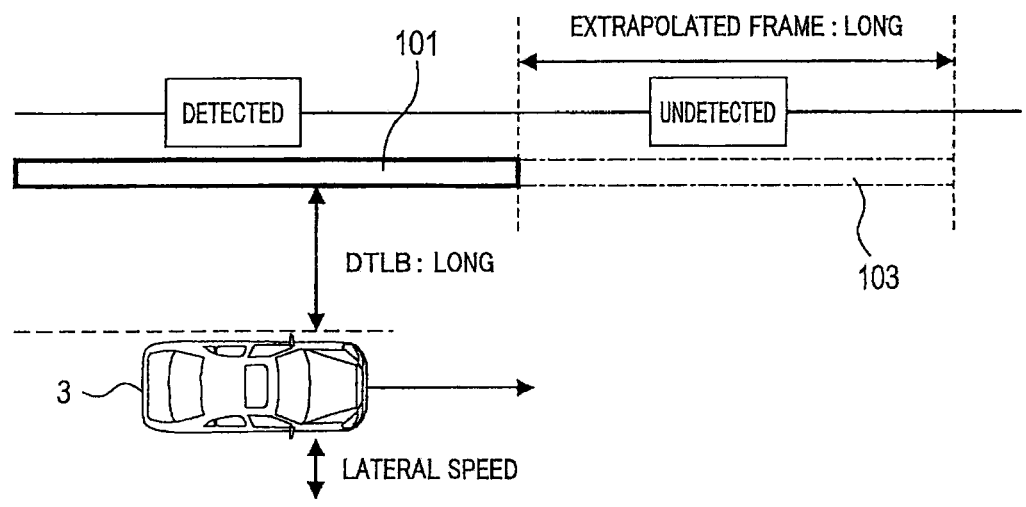
(a)
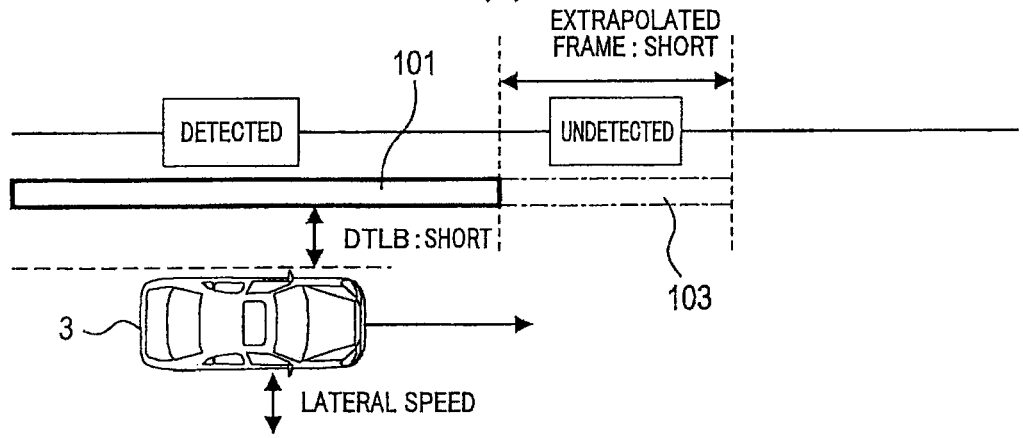
(b)

FIG.9
(a)
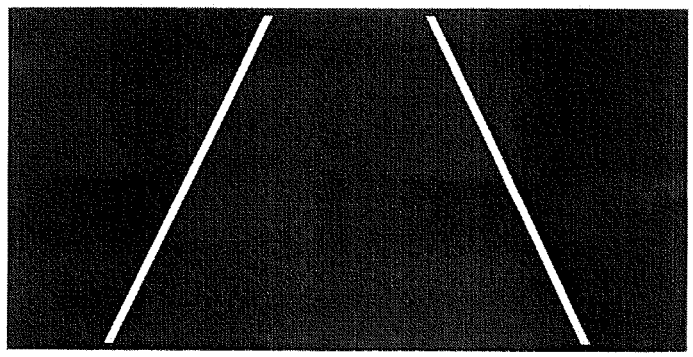
(b)
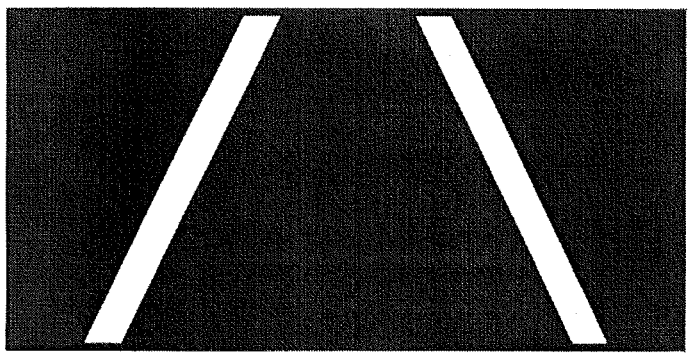

DRIVING SUPPORT APPARATUS AND DRIVING SUPPORT METHOD

CROSS-REFERENCE TO RELATED APPLICATIONS

This application is a U.S. National Phase Application under 35 U.S.C. 371 of International Application No. PCT/JP2013/055118 filed on Feb. 27, 2013 and published in Japanese as WO 2013/129470 A1 on Sep. 6, 2013. This application is based on and claims the benefit of priority from Japanese Patent Application No. 2012-044249 filed Feb. 29, 2012. The entire disclosures of all of the above applications are incorporated herein by reference.

BACKGROUND OF THE INVENTION

Technical Field

The present invention relates to a driving support apparatus and a driving support method for providing the driver of a vehicle with support in driving.

Background Art

In recent years, apparatuses that provide the driver of a vehicle with various types of support in driving are known. As such an apparatus, for example, a system disclosed in patent publication PTL 1 is proposed. The apparatus uses an image of an area in the traveling direction of the vehicle which has been captured by an on-board camera. Specifically, the apparatus detects cruising lanes (simply, lanes such as white lines) on the road from the image using image recognition. The apparatus then performs driving support, such as issuing an alert, based on the positional relationship between the detected cruising lane and the vehicle.

CITATION LIST

Patent Literature

PTL1 JP-A-2010-247656

In the case of the above-described driving support apparatus that performs driving support based on detection of the cruising lane, driving support cannot be performed when the cruising lane cannot be detected. Therefore, when the cruising lane cannot be detected, setting an extrapolation cruising lane by extrapolating a cruising lane that has been detected in the past can be considered. Driving support can then be performed using the extrapolation cruising lane.

However, even when the extrapolation cruising lane is set, driving support cannot be appropriately performed if the setting conditions for the extrapolation cruising lane are inappropriate.

SUMMARY

Hence it is desired to provide a driving support apparatus that is capable of appropriately performing driving support even when a cruising lane cannot be detected.

A driving support apparatus according to a suitable aspect is a driving support apparatus that supports driving a vehicle that is traveling on a road. The driving support apparatus includes: a cruising lane detecting means for detecting a cruising lane on the road; and an extrapolating means for setting an extrapolation cruising lane formed by extrapolating a previously detected cruising lane when the cruising lane cannot be detected by the cruising lane detecting means. Furthermore, the driving support apparatus includes: an extrapolation time deciding means for deciding a length of time over which the extrapolation cruising lane is set, based on the distance between the previously detected cruising lane and the vehicle and/or a lateral speed of the vehicle; and a deviation determining means for determining whether or not the vehicle will deviate from the cruising lane detected by the cruising lane detecting means or the extrapolation cruising lane set by the extrapolating means, within a reference time set in advance.

Therefore, the driving support apparatus can perform driving support using the extrapolation cruising lane even when the cruising lane cannot be detected.

In addition, the driving support apparatus decides the length of time over which the extrapolation cruising lane is set based on the distance between the previously detected cruising lane and the vehicle and/or the lateral speed of the vehicle. Therefore, the time over which the extrapolation cruising lane is set can be appropriately decided.

In addition, a driving support method according to another aspect also achieves similar working effects as those described above.

BRIEF DESCRIPTION OF DRAWINGS

In the accompanying drawings:

FIGS. 7(*a*) and 7(*b*) are explanatory diagrams of a cruising lane, an extrapolation cruising lane, and an extrapolation frame;

FIGS. 9(*a*) and 9(*b*) are an explanatory diagram of a display in a display device and an explanatory diagram of another display in the display device.

DETAILED DESCRIPTION OF THE PREFERRED EMBODIMENTS

An embodiment of the present invention will be described with reference to the drawings.

Configuration of a Driving Support Apparatus

Figure 1:
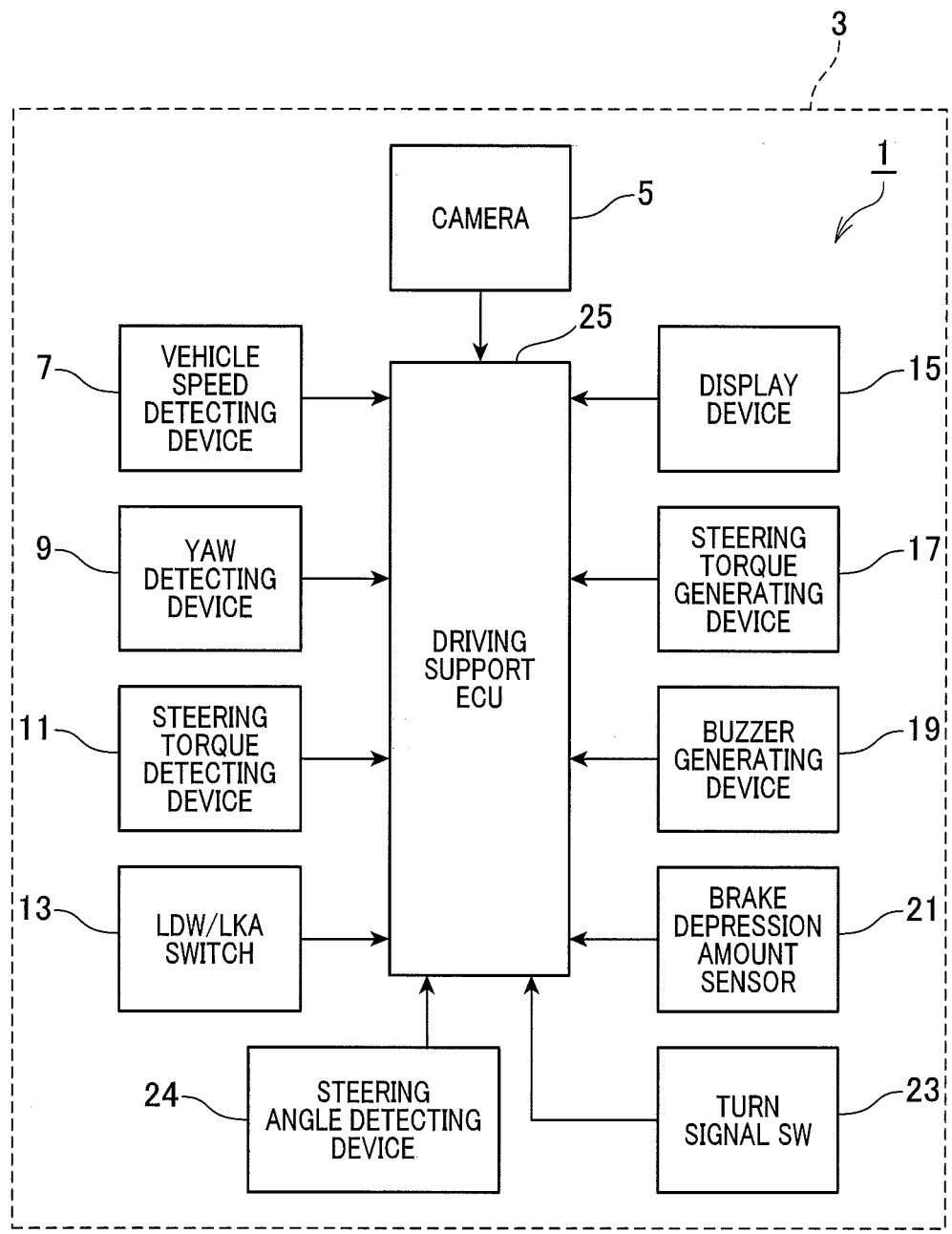
FIG. 1 is a block diagram of a configuration of a driving support apparatus according to an embodiment.
Figure 2:
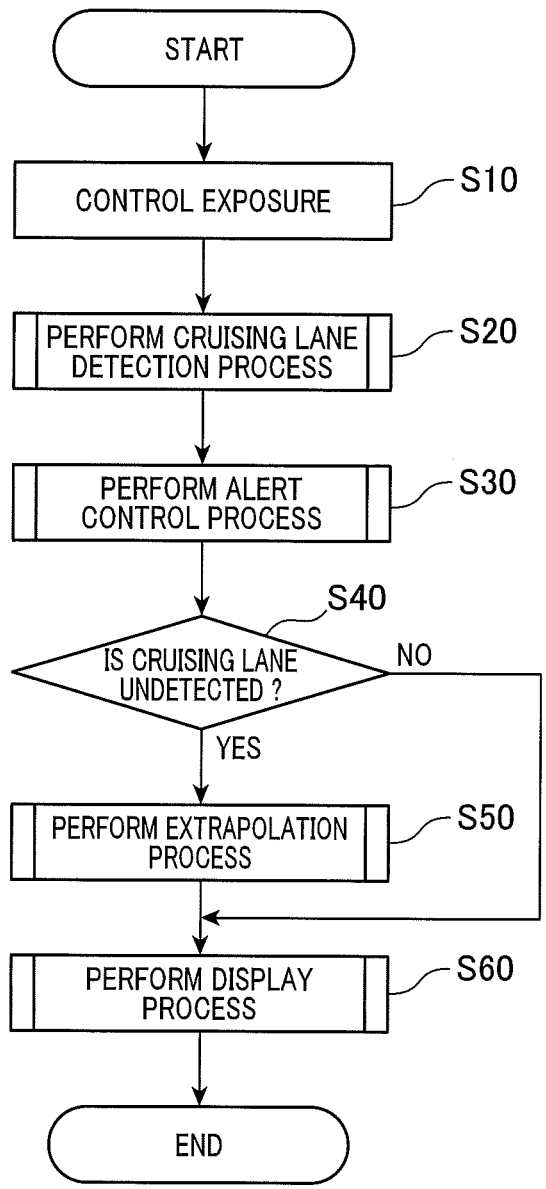
FIG. 2 is a flowchart of a driving support process performed by the driving support apparatus.
Figure 3:
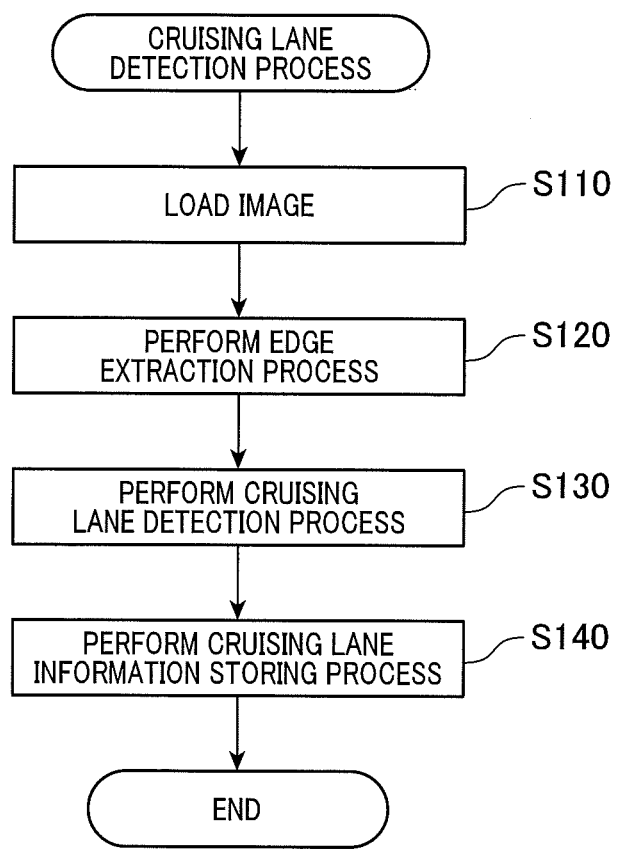
FIG. 3 is a flowchart of a cruising lane detection process performed by the driving support apparatus.
Figure 4:
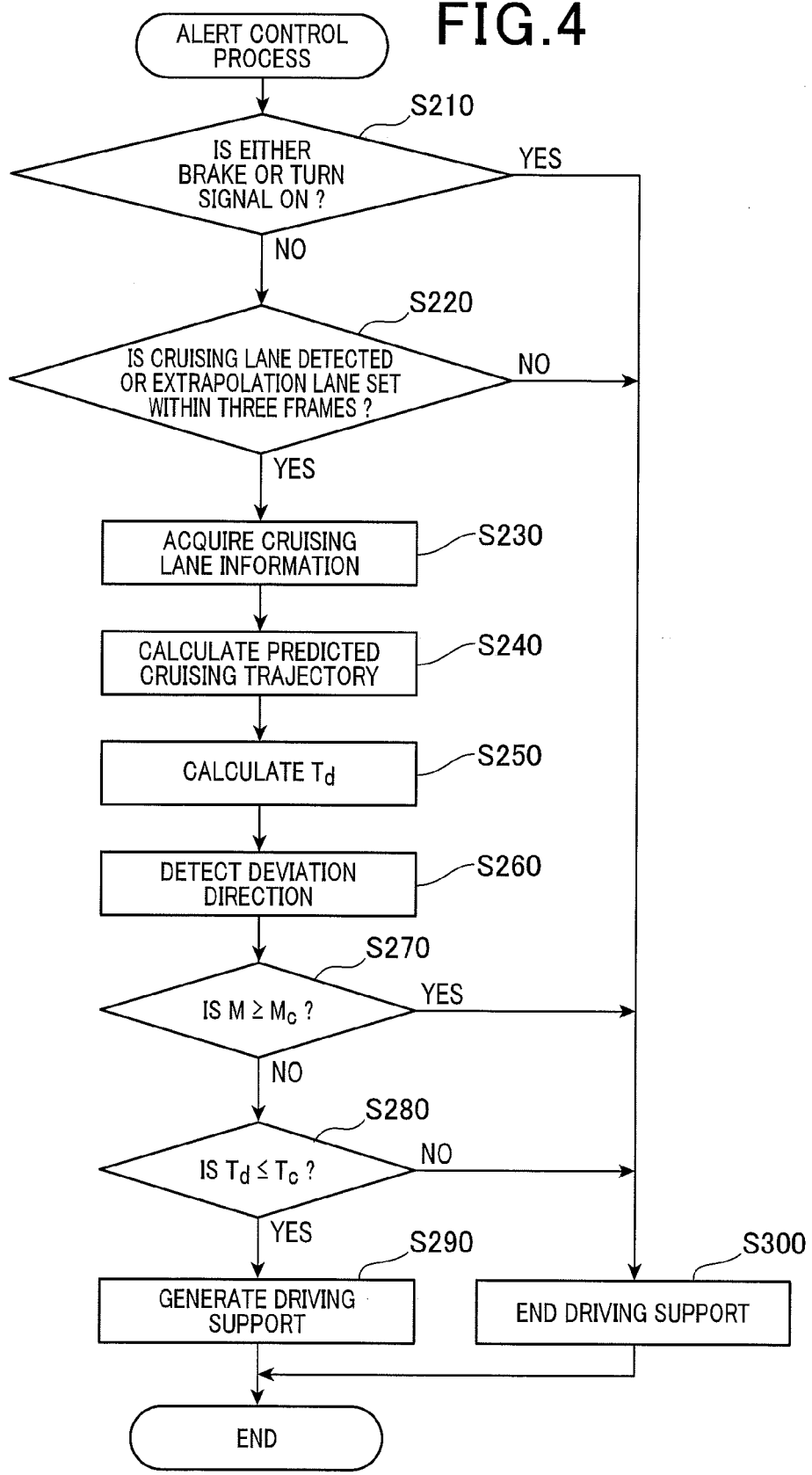
FIG. 4 is a flowchart of an alert control process performed by the driving support apparatus.
Figure 5:
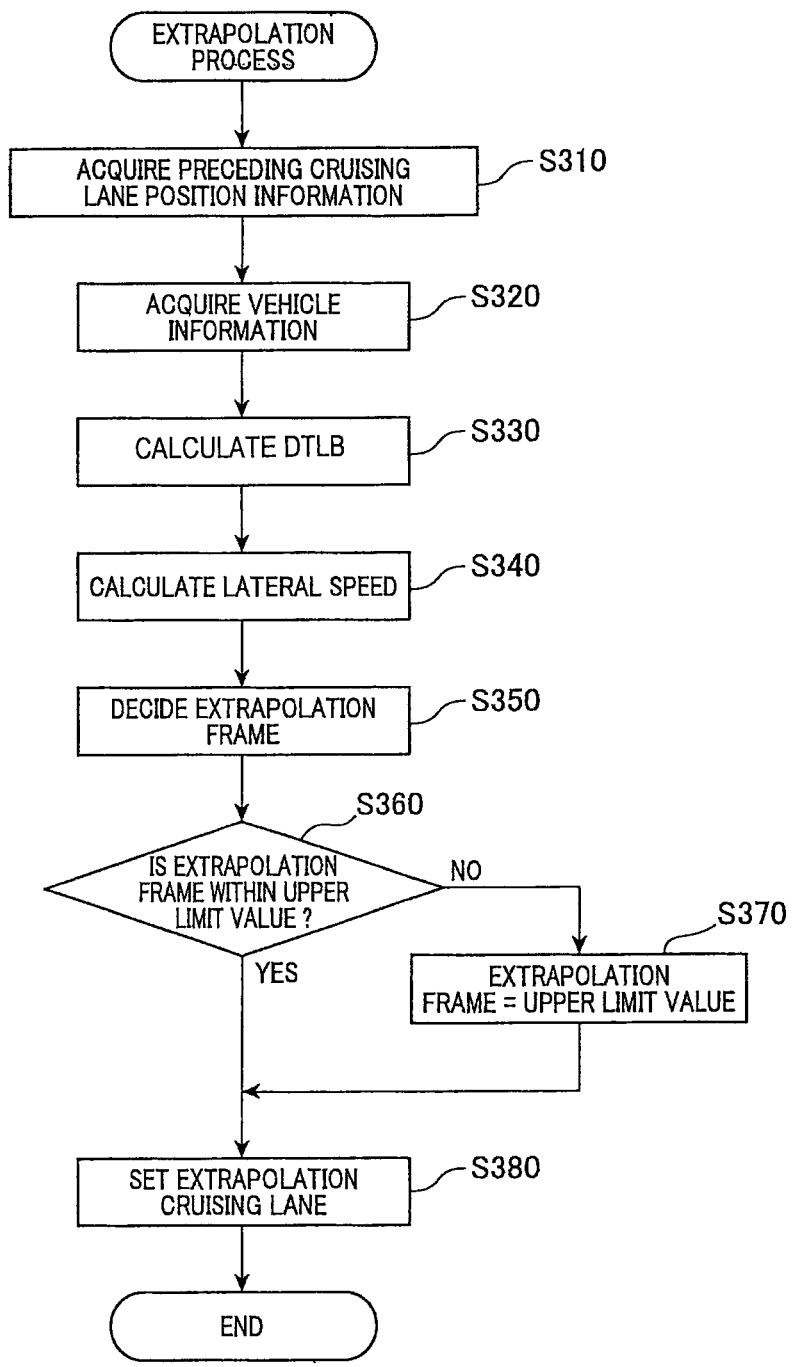
FIG. 5 is a flowchart of an extrapolation process performed by the driving support apparatus.
Figure 6:
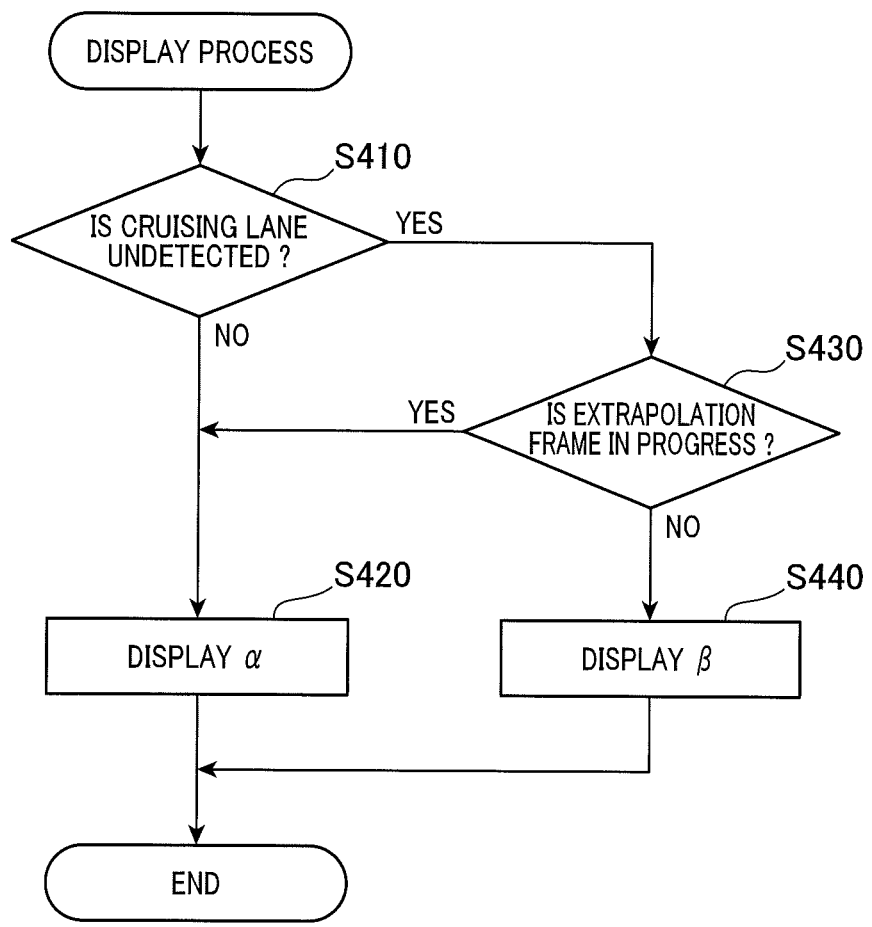
FIG. 6 is a flowchart of a display process performed by the driving support apparatus.

A configuration of a driving support apparatus 1 will be described with reference to FIG. 1. The driving support apparatus 1 is an on-board apparatus that is mounted in a vehicle 3. The driving support apparatus 1 supports in driving the vehicle 3 that is traveling on a road. The driving support apparatus 1 includes a camera 5 (corresponding to a cruising lane detecting means), a vehicle speed detecting device 7, a yaw detecting device 9, a steering torque detecting device 11, a lane departure warning/lane keeping assist (LDW/LKA) switch 13, a display device 15 (corresponding to a display means), a steering torque generating device 17, a buzzer generating device 19 (corresponding to an alerting means), a brake depression amount sensor 21, a turn signal switch 23, a steering wheel angle detecting device 24, and a driving support electronic control unit (ECU) 25 (functionally composed of the cruising lane detecting means, an extrapolating means, an extrapolation time deciding means, and a deviation determining means).

The camera 5 is mounted onto the center front side of the vehicle 3. The camera 5 captures a scene including the road ahead of the own vehicle 3 and outputs image data thereof.

The vehicle speed detecting device 7 detects the vehicle speed of the vehicle 3. The yaw detecting device 9 detects the angular speed (yaw rate) in the turning direction of the vehicle 3. The steering torque detecting device 11 detects the amount of torque M applied to the steering wheel by the driver of the vehicle 3.

The LDW/LKA switch 13 is a switch that is capable of being turned ON and OFF by the driver of the vehicle 3. When the LDW/LKA switch 13 is turned ON, the driving support apparatus 1 performs a driving support process, described hereafter. When the LDW/LKA switch 13 is turned OFF, the driving support apparatus 1 does not perform the driving support process.

The display device 15 is configured by a liquid crystal display. During the driving support process, described hereafter, the display device 15 displays a predetermined display (such as a display α or a display β, described hereafter). During the driving support process, described hereafter, the steering torque generating device 17 adds a weak steering torque for alert to the steering wheel of the vehicle 3 in the direction opposite to a deviation direction, described hereafter.

During the driving support process, described hereafter, the buzzer generating device 19 generates an alert buzzer. The brake depression amount sensor 21 detects a brake operation state of the vehicle 3. The turn signal switch 23 detects a turn-signal operation state of the vehicle 3. The steering wheel angle detecting device 24 detects the angle (steering angle) of the steering wheel.

The driving support ECU 25 performs the driving support process, described hereafter, based on input from each section. The driving support ECU 25 is a known microprocessor that includes a central processing unit (CPU), a read-only memory (ROM), a random access memory (RAM), an electrically erasable programmable read-only memory (EEPROM), a digital signal processor (DSP), and the like.

Processes Performed by the Driving Support Device

The driving support process performed by the driving support apparatus 1 will be described with reference to FIG. 2 to FIG. 9. The driving support process is started when the power of the vehicle 3 is turned ON. Subsequently, the driving support process is repeatedly performed every fixed amount of time (such as 100 msec). At Step S10 in FIG. 2, the driving support apparatus 1 controls the exposure of the camera 5. The exposure of the camera 5 is controlled so that the difference in luminance between a cruising lane (or simply, lane such as white lines) in the road and the road surface is sufficiently large during a cruising lane detection process, described hereafter.

At Step 20, the driving support apparatus 1 performs the cruising lane detection process. The cruising lane detection process will be described with reference to FIG. 3. At Step 110 in FIG. 3, the driving support apparatus 1 captures an image in the traveling direction of the vehicle 3 using the camera 5. The driving support apparatus 1 then loads the captured image. The image includes the road in the traveling direction of the vehicle 3.

At Step 120, the driving support apparatus 1 performs an edge extraction process. The edge extraction process is a process for extracting an edge in the image that has been loaded at above-described Step 110. In the edge extraction process, first, a derivative is calculated for each horizontal line (all pixels of which all coordinate values in the vertical direction are equal) in the image, using a differential filter. In other words, the rate of change in luminance value between adjacent pixels is calculated for a plurality of pixels that compose a horizontal line. When the camera 5 is a color camera, the rate of change in RGB signals outputted from the color camera, or color-difference signals when the RGB signal is converted to a luminance signal and color-difference signals may be calculated.

The driving support apparatus 1 then determines whether or not the calculated derivative is a predetermined threshold or greater. When the derivative is determined to be the threshold or greater, the luminance value is considered to have significantly changed between the adjacent pixels. The driving support apparatus 1 registers the coordinate values of the pixel as an edge. The driving support apparatus 1 performs the above-described process on all pixels in the image.

At Step 130, the driving support apparatus 1 extracts a white line candidate based on the edges registered at above-described Step 120, using a known straight-line extraction technique, for example, Hough transform process, or the like. A plurality of white line candidates may be extracted from an image in a single frame. When a plurality of white line candidates are detected, composite lines are detected by known pattern matching (image processing) and the cruising lane (traffic lane boundaries) is detected.

At Step 140, the driving support apparatus 1 stores the cruising lane detected at above-described Step 130 in the RAM provided in the driving support ECU 25. On the other hand, when the cruising lane is not detected at above-described Step 130, the driving support apparatus 1 registers the fact that no cruising lane is detected.

Returning to FIG. 2, at Step 30, the driving support apparatus 1 performs an alert control process. The alert control process will be described with reference to FIG. 4. At Step 210 in FIG. 4, the driving support apparatus 1 determines whether or not the state is a brake operating state or a turn signal operating state based on input information from the brake depression amount sensor 21 and the turn signal switch 23. When affirmative (YES), the driving support apparatus 1 proceeds to Step 300. When negative (NO) (when the state is not the brake operating state or the turn signal operating state), the driving support apparatus 1 proceeds to Step 220.

At Step 220, the driving support apparatus 1 determines whether or not at least either of the following condition A and condition B is met.

Condition A: the cruising lane is detected in any of the three immediately preceding frames.

Condition B: an extrapolation cruising lane (described hereafter) is set and an extrapolation frame (described hereafter) is not yet completed.

A single frame refers to a single execution of the driving support process. The interval between frames is a fixed amount of time (such as 100 ms).

When affirmative (YES, the condition A or the condition B is met), the driving support apparatus 1 proceeds to Step 230. When negative (NO, neither condition A nor B is met), the driving support apparatus 1 proceeds to Step 300.

At Step 230, the driving support apparatus 1 acquires the cruising lane that has been detected within the immediately preceding three frames and is stored in the RAM provided in the driving support ECU (refer to above-described Step 140). Alternatively, the driving support apparatus 1 acquires an extrapolation cruising lane (referred to hereinafter as a cruising lane or the like) that has been set as described hereafter and is stored in the RAM provided in the driving support ECU 25. However, the extrapolation cruising lane that is acquired is only that of which the extrapolation frame is not yet completed.

At Step 240, the driving support apparatus 1 calculates a predicted cruising trajectory of the vehicle 3 in the following manner. When the vehicle speed inputted from the vehicle speed detecting device 7 is V (m/sec), the yaw rate inputted from the yaw detecting device 9 is ω (rad/sec), the traveling direction of the vehicle 3 at the current position is a Y direction, and the vehicle width direction is an X direction, the vehicle 3 moves forward 0.1 V in 0.1 seconds. During this time, the rotation angle (angle of the traveling direction of the vehicle 3 in relation to the traveling traffic lane) increases by 0.1 ω. Therefore, a vehicle position (X(T), (Y(T)) after T seconds when the current position of the vehicle 3 is the point of origin is expressed as follows.

$$X(T)=0.1V(\sin 0.1\ \omega+\sin 0.2\omega+\ldots+\sin(T-0.1)\omega))$$

$$Y(T)=0.1V(\cos 0.1\ \omega+\cos 0.2\omega+\ldots+\cos(T-0.1)\omega))$$

The above-described trajectory of the vehicle position is the predicted cruising trajectory of the vehicle 3.

At Step 250, the driving support apparatus 1 calculates a deviation time Td based on the cruising lane and the like acquired at above-described Step 230 and the predicted cruising trajectory calculated at above-described Step 240. The deviation time Td is the amount of time required for the vehicle 3 to deviate from the cruising lane or the like. The deviation time Td is the amount of time from the current time until the predicted cruising trajectory deviates from the cruising lane or the like.

At Step 260, the driving support apparatus 1 detects the deviation direction (left or right) of the vehicle 3 depending whether the predicted cruising trajectory deviates from the left or right cruising lane or the like when the deviation time Td is calculated at above-described Step 250.

At Step 270, the driving support apparatus 1 determines whether or not the steering torque M detected by the steering torque detecting device 11 is a reference threshold Mc set in advance or greater. When determined that the steering torque M is the reference threshold Mc or greater, the driving support apparatus 1 proceeds to Step 300. When determined that the steering torque M is less than the reference threshold Mc, the driving support apparatus 1 proceeds to Step 280.

At Step 280, the driving support apparatus 1 determines whether or not the deviation time Td calculated at above-described Step 250 is a reference time Tc set in advance or less. When determined that the deviation time Td is the reference time Tc or less, the driving support apparatus 1 proceeds to Step 290. When determined that the deviation time Td exceeds the reference time Tc, the driving support apparatus 1 proceeds to Step 300. At Step 290, the driving support apparatus 1 generates driving support. In other words, the driving support apparatus 1 generates a buzzer sound using the buzzer generating device 19. The driving support apparatus 1 also applies steering torque on the steering wheel in the direction opposite to the deviation direction detected at above-described Step 260, using the steering torque generating device 17. The driving support apparatus 1 then ends the process.

At Step 290, the driving support apparatus 1 ends driving support. In other words, the driving support apparatus 1 stops the buzzer sound produced by the buzzer generating device 1 and sets the steering torque of the steering torque generating device 17 to zero. The driving support apparatus 1 then ends the process.

Returning to FIG. 2, at Step 40, the driving support apparatus 1 determines whether or not a condition is met, the condition being that the cruising lane is not detected at immediately preceding above-described Step 20 (in the same frame), and the cruising lane has been detected at above-described Step 20 in the preceding frame (in other words, a state in which the cruising lane is detected changes to a state in which the cruising lane is not detected). When affirmative (YES), the driving support apparatus 1 proceeds to Step 50. When negative (NO), the driving support apparatus proceeds to Step 60.

At Step 50, the driving support apparatus 1 performs an extrapolation process. The extrapolation process will be described with reference to FIG. 5. At Step 310 in FIG. 5, the driving support apparatus 1 acquires position information of the cruising lane detected in the immediately preceding frame.

At Step 320, the driving support apparatus 1 acquires the angle of the steering wheel (vehicle information) from the steering wheel angle detecting device 24 and the vehicle speed (vehicle information) from the vehicle speed detecting device 7.

At Step 330, the driving support apparatus 1 calculates the distance (referred to, hereinafter, as DTLB) in the vehicle width direction from a tire (tire on the cruising lane side) on the vehicle 3 to the cruising lane acquired at above-described Step 310.

At Step 340, the driving support apparatus 1 calculates the speed (referred to, hereinafter, as a lateral speed) in the lateral direction (vehicle width direction) of the vehicle 3 from the steering wheel angle and the vehicle speed acquired at above-described Step 320.

At Step 350, the driving support apparatus 1 decides the extrapolation frame based on the DTLB calculated at above-described Step 330 and the lateral speed calculated at above-described Step 340. The extrapolation frame refers to the number of frames over which the extrapolation cruising lane set at Step 380, described hereafter, is maintained (the amount of time over which the extrapolation cruising lane is set). When the DTLB and the lateral speed are inputted in the ROM provided in the driving support ECU 25, a map for outputting an extrapolation frame corresponding thereto is stored. The extrapolation frame is decided using the map. The extrapolation frame is set to be shorter as the DTLB becomes shorter, under the same lateral speed condition. In addition, the extrapolation frame is set to be shorter as lateral speed increases, under the same DTLB condition.

At Step 360, the driving support apparatus 1 determines whether or not the extrapolation frame decided at above-described Step 350 is within an upper limit value (such as 10) set in advance. When determined that the extrapolation frame is within the upper limit value, the driving support apparatus 1 proceeds to Step 380. When determined that the extrapolation frame exceeds the upper limit value, the driving support apparatus 1 proceeds to Step 370.

At Step 370, the driving support apparatus 1 sets the upper limit value used at above-described Step 360 as the extrapolation frame, instead of the value decided at above-described Step 350.

At Step 380, the driving support apparatus 1 sets the extrapolation cruising lane. As shown in FIGS. 7(*a*) and 7(*b*) and FIGS. 8(*a*) and 8(*b*), an extrapolation cruising lane 103 is a virtual cruising lane formed by extrapolating a cruising lane 101 acquired at above-described Step 310. When the cruising lane 101 acquired at above-described Step 310 is a straight line, a straight line that is an extension of the cruising lane in the traveling direction of the vehicle 3 becomes the extrapolation cruising lane 103. In addition, when the cruising lane 101 acquired at above-described Step 310 is a curve, a curve that is an extension of the cruising lane at the same curvature in the traveling direction of the vehicle 3 becomes the extrapolation cruising lane 103. In addition, the extrapolation cruising lane 103 may be a straight line regardless of the shape of the cruising lane 101.

Figure 8:
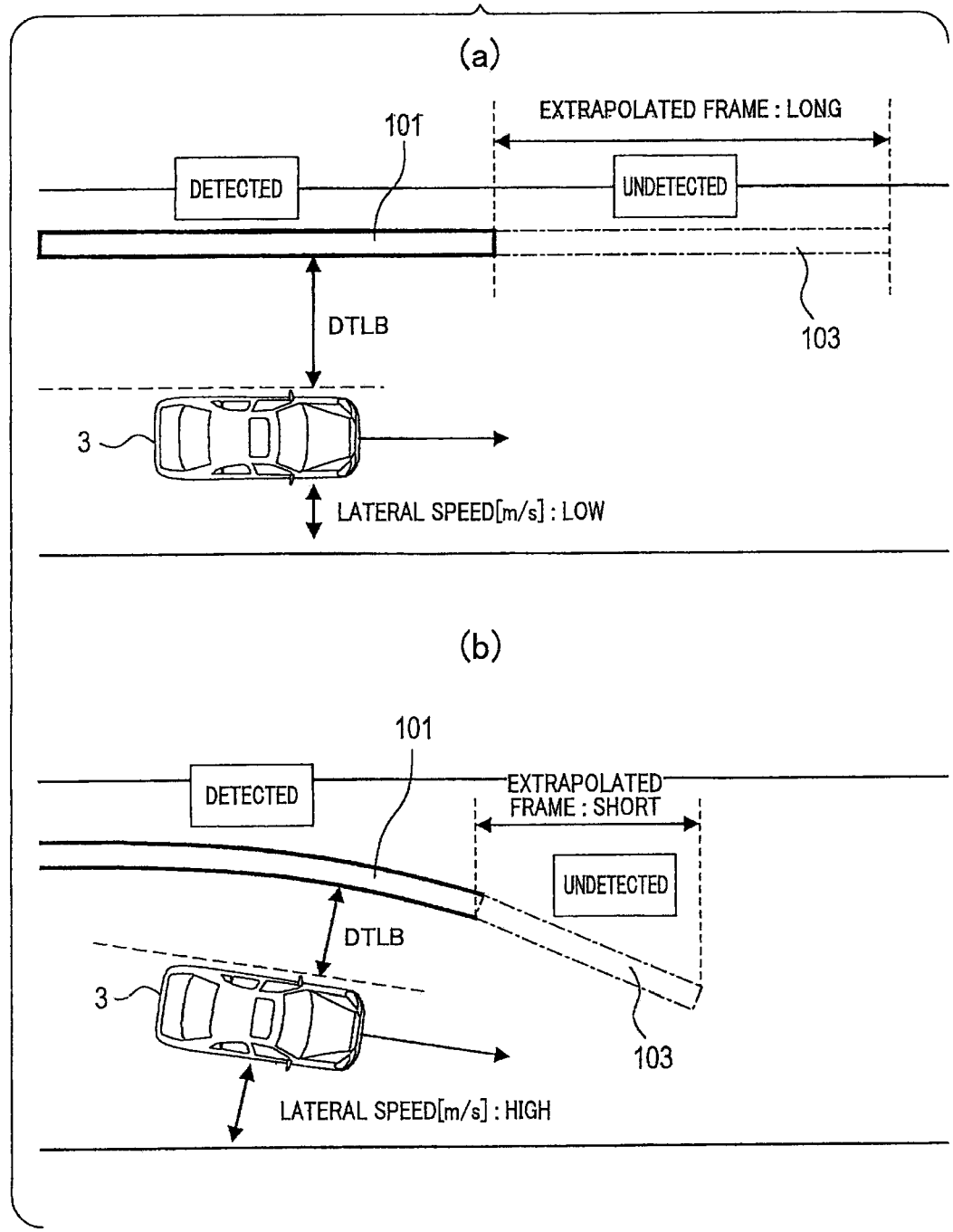
FIGS. 8(*a*) and 8(*b*) are explanatory diagrams of a cruising lane, an extrapolation cruising lane, and an extrapolation frame.

The extrapolation cruising lane that has been set is maintained only for the duration of the extrapolation frame decided at Step 350 or Step 370. As shown in FIGS. 7(*a*) and 7(*b*), the extrapolation frame is set to be shorter as the DTLB becomes shorter, under the same lateral speed condition. In addition, as shown in FIGS. 8(*a*) and 8(*b*), the extrapolation frame is set to be shorter as the lateral speed increases, under the same DTLB condition.

Returning to FIG. 2, at Step 60, the driving support apparatus 1 performs a display process. The display process will be described with reference to FIG. 6. At Step 410 in FIG. 6, the driving support apparatus 1 determines whether or not the cruising lane was detected at immediately preceding above-described Step 20 (in the same frame). When determined that the cruising lane is detected, the driving support apparatus 1 proceeds to Step 420. When determined that the cruising lane has not been detected, the driving support apparatus 1 proceeds to Step 430.

At Step 430, the driving support apparatus 1 determines whether or not an extrapolation cruising lane has been set in the past (in the preceding or earlier frames) and the extrapolation frame is currently not completed. When determined that the extrapolation frame is not completed, the driving support apparatus 1 proceeds to Step 420. When determined otherwise, the driving support apparatus 1 proceeds to Step 440.

At Step 420, the driving support apparatus 1 displays a display α shown in FIG. 9(*b*) in the display device 15. The display indicates that the cruising lane is detected or the extrapolation cruising lane is set. At Step 440, the driving support apparatus 1 displays a display β shown in FIG. 9(*a*) in the display device 15. The display indicates that the cruising lane is not detected and the extrapolation cruising lane is not set. The driving support apparatus 1 then completes the driving support process.

Effects (1) The driving support apparatus 1 determines the extrapolation frame based on the DTLB and the lateral speed of the vehicle 3. Therefore, the extrapolation frame can be set to an appropriate value. For example, in the driving support apparatus 1, the extrapolation frame is set to be short when the DTLB is short or the lateral speed is high (when execution of the driving support process that is essentially unnecessary tends to occur when the extrapolation cruising lane is used). Therefore, execution of the driving support process that is essentially unnecessary can be prevented in a state in which the cruising lane cannot be detected.

In addition, in the driving support apparatus 1, the extrapolation frame is set to be long when the DTLB is long or the lateral speed is low (when the possibility is high that the driving support process can be appropriately performed). Therefore, an appropriate driving support process can be performed over a long period of time, even in a state in which the cruising lane cannot be detected.

The present invention is not limited in any way by the above-described embodiment. It goes without saying that various embodiments are possible without departing from the scope of the present invention.

For example, in addition to the front camera, a side or rear camera may be utilized.

For example, at above-described Step 290, the driving support may be either of the generation of the buzzer by the buzzer generating device 19 and the generation of steering torque by the steering torque generating device 17.

In addition, at above-described Step 340, the curvature of the cruising lane detected at above-described Step 130 may be calculated. The lateral speed may then be calculated from the curvature and the speed of the vehicle 3.

In addition, at above-described Step 350, the extrapolation frame may be decided based on either of the DTLB and the lateral speed.

In addition, instead of the DTLB, the distance between a predetermined position in the vehicle 3 (such as the center position in the vehicle width direction of the vehicle 3, the driver position, or an end portion of the body in either the left or right direction) and the cruising lane.

In addition, at above-described Step 380, rather than only the cruising lane detected in the immediately preceding frame, a plurality of cruising lanes detected in a plurality of previous frames (such as from an n-th previous frame to the immediately preceding frame) may be extrapolated. The extrapolation cruising lane may thereby be set. The above-mentioned n may be any of 2, 3, 4, 5, 6, etc.

In addition, in the driving support process, the cruising lane detection process (above-described Step 20) and the extrapolation process (above-described Step 50) may be performed separately for the cruising lane on the left side of the vehicle 3 and the cruising lane on the right side. Alternatively, the cruising lane detection process and the extrapolation process may be performed for either one of the cruising lanes. In addition, in the display process (above-described Step 60), detected/undetected may be displayed for each of the left and right cruising lanes.

REFERENCE SIGNS LIST

1 driving support apparatus
3 vehicle
5 camera
7 vehicle speed detecting device
9 yaw detecting device
11 steering torque detecting device
13 LDW/LKA switch
15 display device
17 steering torque generating device
19 buzzer generating device
21 brake depression amount sensor
23 turn signal switch
24 steering wheel angle detecting device
25 driving support ECU
101 cruising lane
103 extrapolation cruising lane

What is claimed is:

1. A driving support apparatus that supports driving of a vehicle that is traveling on a road, the driving support apparatus comprising:

cruising lane detecting means for detecting a first cruising lane on the road;

extrapolating means for setting an extrapolation cruising lane formed by extrapolating a previously detected cruising lane when the first cruising lane cannot be detected by the cruising lane detecting means;

extrapolation time deciding means for deciding a length of time over which the extrapolation cruising lane is set, based on the distance between the previously detected cruising lane and the vehicle and/or a lateral speed of the vehicle;

deviation determining means for determining whether or not the vehicle will deviate from the first cruising lane detected by the cruising lane detecting means or the extrapolation cruising lane set by the extrapolating means, within a reference time set in advance; and display means for displaying a predetermined display when the cruising lane detecting means detects the first cruising lane or the extrapolation cruising lane is set, the predetermined display indicating that the first cruising lane or the extrapolation cruising lane is set, the predetermined display indicating that the first cruising lane is detected or the extrapolation cruising lane is set.

2. The driving support apparatus according to claim 1, wherein:

the extrapolating means extrapolates a cruising lane that has been detected immediately before and sets the extrapolation cruising lane, when the cruising lane detecting means changes from a state in which the first cruising lane is detected to a state in which the first cruising lane is not detected.

3. The driving support apparatus according to claim 2, further comprising:

alerting means for generating an alert when the deviation determining means determines that deviation from the first cruising lane will occur.

4. The driving support apparatus according to claim 1, further comprising:

alerting means for generating an alert when the deviation determining means determines that deviation from the first cruising lane will occur.

5. A driving support method that supports driving of a vehicle that is traveling on a road, the driving support method comprising:

attempting to detect a first cruising lane on the road by performing a cruising lane detection process;

setting an extrapolation cruising lane formed by extrapolating a previously detected cruising lane when the first cruising lane cannot be detected;

deciding a length of time over which the extrapolation cruising lane is set based on the distance between the previously detected cruising lane and the vehicle and/or a lateral speed of the vehicle; and determining whether or not the vehicle will deviate from the detected first cruising lane or the set extrapolation cruising lane within a reference time set in advance.

* * * * *